R. G. INWOOD.
BOX AND METHOD OF MAKING THE SAME.
APPLICATION FILED NOV. 20, 1914.

1,252,120.

Patented Jan. 1, 1918.

Witnesses:
Carl L. Choate.
Horace A. Croseman.

Inventor:
Richard G. Inwood,
by Kenny, Booth, Jenny & Kenny
Attys.

UNITED STATES PATENT OFFICE.

RICHARD G. INWOOD, OF SOUTH BEND, INDIANA; MARY C. INWOOD ADMINISTRATRIX OF SAID RICHARD G. INWOOD, DECEASED.

BOX AND METHOD OF MAKING THE SAME.

1,252,120.  Specification of Letters Patent.  Patented Jan. 1, 1918.

Application filed November 20, 1914. Serial No. 873,168.

*To all whom it may concern:*

Be it known that I, RICHARD G. INWOOD, a citizen of the United States, and a resident of South Bend, county of St. Joseph, and State of Indiana, have invented an Improvement in Boxes and Methods of Making the Same, of which the following description, in connection with the accompanying drawings, is a specification, like characters on the drawings representing like parts.

This invention relates to boxes and to a method of making the same. Among other objects it aims to provide a box which is simple and light in construction, cheap to manufacture and easy to handle without injury thereto.

Figure 1:
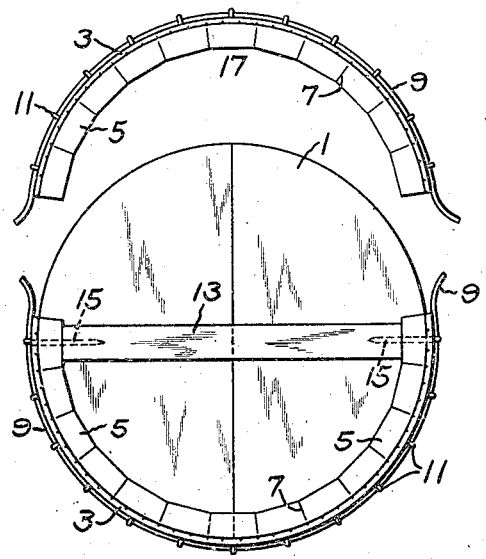
Figure 2:
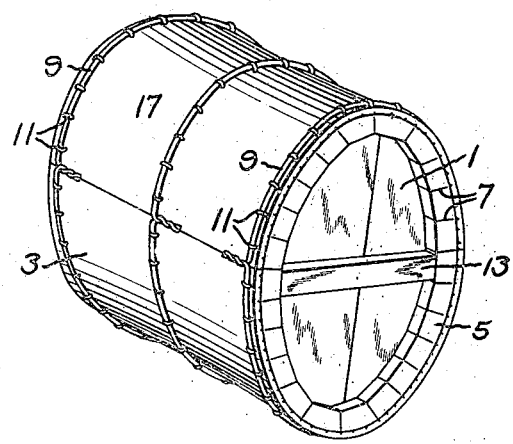

The character of the invention may be best understood by reference to the following description of an illustrative embodiment thereof shown in the accompanying drawing, wherein:

Figure 1 is a side elevation of an illustrative box shown herein as embodying the invention; and Fig. 2 is a perspective view of said box.

Referring to the drawing, the illustrative box shown therein as embodying the invention comprises opposed ends 1 and side material 3 wrapped about said ends. This material should be sufficiently thin to permit the same to be readily flexed about said ends. In some cases to facilitate the flexing of the material it may be scored or grooved on one surface thereof by passing the same between upper and lower rolls, one being smooth and the other fluted.

To reinforce the material it is provided with cleats 5 of wood or other appropriate material and each preferably of a length substantially the same as the length of the side material. To enable the cleats to be flexed with the side material, V-shaped incisions 7 or other appropriate notches are made in the cleats transversely to the length thereof and extending partially therethrough. Preferably these notches extend to within a short distance of the back of the cleat leaving a continuous rib thereat, thereby maintaining the integrity of the cleat. As shown herein, the cleats are each provided with a series of such notches spaced equal distances apart. As a result, when the cleat is flexed sufficiently to close the notches or cause the opposed walls of each notch to engage one another a substantially circular form is produced.

To further strengthen the box binding wires or equivalent elements 9 are provided, extending the length of the material and preferably somewhat beyond the same to provide ends which may be twisted or otherwise connected, as more fully hereinafter described. These binding wires may be secured to the material by stitching or by driving staples 11 straddling the wires through the material into the cleats.

The ends of the box are substantially circular so that when the blank or unit including the material, cleats and binding wires, is wrapped about the ends, a box is provided which is substantially cylindrical in form. Preferably the ends of the box are set within the cleats, thereby preventing outward displacement of the ends. To prevent inward displacement of the ends they may be nailed or otherwise secured to the side material or cleats. Herein the ends are shown as reinforced by straight cleats 13 extending diametrically across the same transversely to the length of the grain in the wood. These cleats preferably are made somewhat shorter than the diameters of the ends so that they may fit within the circular cleats of the side material and have their ends come into abutting engagement therewith.

The straight cleats of the ends may be utilized in securing the latter to the side material by driving screws or nails 15 through the side cleats and into the ends of said straight cleats. Thus, when it is desired to remove the ends, it is merely necessary to withdraw said screws or nails.

To permit access to the interior of the box a portion of the blank may be utilized to constitute a cover 17. This cover may vary in size according to the use to which the box is to be applied. As shown herein, a cover is provided somewhat less in length than an arc of 180°. The cover may be formed by cutting or otherwise separating from the unit the length required. Thus the cover would be constructed similarly to the curved side of the box and would comprise sheet material, notched cleats, and binding wires stapled or otherwise secured thereto.

To provide a hinged connection of the cover with the side of the box the binding wire terminals at one end of the cover may be interlinked or otherwise connected with binding wire terminals of the side. The cover may be locked or fastened in closed position by twisting together other binding wire terminals of the side and cover.

In curving the side material into box form it tends to concave or bulge inward intermediate the cleats at the ends of the box. This is advantageous in rolling the box along the floor since the portions of the side material intermediate said ends are spaced from the floor and the burden of supporting the box is localized to the cleats which are better able to sustain it.

While the box as shown herein is provided with ends these need not be employed in all cases since the internal cleats may serve to engage the contents of the box and hold the same therein. Furthermore, the ends are not essential to cause the blank to assume a cylindrical form when folded since the curve of the cleats is limited and determined by the closing of the notches when the cleat is flexed. The wedge shaped sections between notches will act on the principle of the arch to prevent collapsing of the box.

The box blank may be very readily folded into box form. If the ends are employed the blank is wrapped about the ends and the binding wire terminals are twisted together to retain the blank in shape.

The box may be very quickly knocked down by severing the wires adjacent the twists therein, opening the blank and removing the ends therefrom. Then the blank may be spread out flat and the ends superposed thereon, thereby providing a compact package occupying very little space in storage or shipment. The facility with which the box may be assembled is an advantageous feature since it enables the box to be shipped to the user in knock-down form, it being a simple matter for him to assemble parts into box form as above described.

While the cover is shown herein as separate from the body of the box it will be understood that the portion of the blank constituting the cover may be a continuation of the blank forming the side of the box if desired.

The box described is extremely light and strong, requiring little material and labor in making the same. It also may be very easily handled. Its circular shape permits the same to be readily rolled without jar or injury to the box or its contents. In its general form the box is similar to a barrel and would be classified in freight tariff schedules as such. Since the freight rates on barrels are less than on boxes, there would thus be a saving in shipping.

Having described one illustrative embodiment of the invention and a method of making the same without limiting the invention thereto, what I claim as new and desire to secure by Letters Patent is:

1. A wire-bound box comprising substantially circular ends; and a side unit wrapped about said ends comprising side material, reinforcing cleats therefor having a series of notches therein extending transversely to the length thereof permitting the flexing of said cleats to conform to the curved contour of said ends, said cleats supporting said ends, and binding wires for said unit.

2. A box comprising substantially circular ends; and a side unit wrapped about said ends comprising side material, strengthening cleats therefor transversely notched to permit flexion thereof into curved form, said cleats supporting said ends, binding wires, and means to secure said binding wires thereto; a portion of said unit having provision permitting the opening thereof to constitute a cover for the box.

3. A box comprising circular ends; and a blank adapted to be wrapped about said ends comprising side material, reinforcing cleats for said material having provision permitting flexion thereof into curved form, binding wires, and means to secure said wires to said material; a portion of said blank being formed to provide a curved cover for the box.

4. A box comprising curvilinear ends; side material; reinforcing cleats for said material having provision permitting flexion thereof into curved form, said cleats supporting said ends, cleats extending transversely across said ends and secured thereto, and means for securing said end cleats to the cleats for said side material.

5. An improvement in the art of making boxes characterized by forming cuts transversely in and partially through cleats; assembling said cleats with side material; applying and securing binding wires thereto; applying substantially circular ends adjacent said cleats, and wrapping said parts as a unit about said circular ends.

6. A box comprising curvilinear ends, side members substantially corresponding to cylindric surfaces, separate interior cleats therefor having provision whereby they may assume an arc shape, wires secured to said members and disposed for joinder to form box-embracing binders.

7. A box comprising circular ends, a substantially cylindrical side wall opening along one of the elements of the cylinder and internal reinforcing ribs of substantial depth for said wall having acute angled notches therein to permit the same to open outwardly under compressive stress.

8. A box comprising a cylindrical wall embodying in its construction side material and supporting cleats therefor, said cleats having acute angled notches to provide segmental blocks fitting together to form a circle whereof the arcs are arches and bindings encircling the box adjacent the cleats and retaining said arches in form.

9. A box comprising a cylindrical wall embodying in its construction side material and supporting cleats therefor, said cleats comprising substantially trapezoidal blocks fitting together with their inclined faces in contact to form a circle whereof the arcs are arches and bindings, and a back portion connecting said blocks and forming hinges between the longer sides thereof of substantially the same transverse extent as the blocks themselves and bindings encircling the box adjacent the cleats and retaining said arches in form.

10. An improvement in the art of making boxes characterized by forming cleats with a series of equally spaced notches therein for permitting bending thereof into curved shape; assembling side material with such cleats; applying and securing binding wires thereto; applying ends having circular arc edges adjacent said cleats and folding said parts as a unit into circular arc form about said ends.

11. An improvement in the art of making boxes characterized by forming a series of equally spaced notches in cleats; assembling side material with such cleats; securing binding wires to said material; separating a portion of the blank thus formed from the body of the blank to form a cover; and curving the parts of the blank to form a substantially cylindrical box.

12. An improvement in the art of making boxes characterized by forming a series of equally spaced notches in cleats; assembling side material with such cleats; securing binding wires to said material; separating a portion of the blank thus formed from the body of the blank to form a cover; curving the parts of the box to form a substantially cylindrical box; and connecting the terminals of the binding wires for the body and the cover.

13. A set of box parts comprising circumferentially curved ends, side material to enwrap said ends, cleats secured to said side material of substantial depth and notched to define a curve substantially the same as that of the ends when said cleats are bowed to close said notches; tensional binding wires to bind the assembled box and means for securing the binding wires thereon.

14. A siding for a cylindrical container comprising side material, cleats of substantial depth and notched to define an appropriate curve when bowed to substantially close said notches, said side material being secured to said cleats.

In testimony whereof, I have signed my name to this specification, in the presence of two subscribing witnesses.

RICHARD G. INWOOD.

Witnesses:
THOMAS JAMIESON,
BARBARA C. PERRY.

Copies of this patent may be obtained for five cents each, by addressing the "Commissioner of Patents, Washington, D. C."